United States Patent
Funakura

(10) Patent No.: US 7,643,060 B2
(45) Date of Patent: Jan. 5, 2010

(54) USER GUIDING APPARATUS AND AN IMAGE CAPTURING SYSTEM, METHOD AND PROGRAM FOR USING SAME

(75) Inventor: Hiroyuki Funakura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 618 days.

(21) Appl. No.: 11/311,150

(22) Filed: Dec. 20, 2005

(65) Prior Publication Data
US 2006/0158520 A1 Jul. 20, 2006

(30) Foreign Application Priority Data
Dec. 20, 2004 (JP) ............................. 2004-368366

(51) Int. Cl.
H04N 5/225 (2006.01)
H04N 7/00 (2006.01)
(52) U.S. Cl. .................. 348/207.99; 348/116; 348/119
(58) Field of Classification Search ........ 348/208.1–14, 348/207.99, 211.99, 113–116, 119; 340/996, 340/995
See application file for complete search history.

(56) References Cited

U.S. PATENT DOCUMENTS

| | | | | |
|---|---|---|---|---|
| 6,459,388 B1* | 10/2002 | Baron | ....................... | 340/996 |
| 6,522,889 B1* | 2/2003 | Aarnio | .................... | 455/456.5 |
| 6,591,068 B1* | 7/2003 | Dietz | ......................... | 396/429 |
| 2001/0048815 A1* | 12/2001 | Nakajima et al. | ............. | 396/310 |
| 2003/0020816 A1* | 1/2003 | Hunter et al. | ............. | 348/231.3 |

FOREIGN PATENT DOCUMENTS

JP 2003-78804 A 3/2003

* cited by examiner

*Primary Examiner*—Tuan Ho
*Assistant Examiner*—Selam T Gebriel
(74) *Attorney, Agent, or Firm*—Birch, Stewart, Kolasch & Birch, LLP

(57) ABSTRACT

The image capturing system includes: a fixed image capturing unit fixedly installed at a predetermined position; a three-dimensional image information storage section for storing a three-dimensional image of the region including the fixed image capturing unit; an image comparison section for comparing a portable captured image captured by a portable image capturing section held by a user with the three-dimensional image stored by the three-dimensional image information storage unit; a position determination section for determining the position and the orientation of the user holding the portable image capturing section based on the comparison result by the image comparison section; and a guiding information presentation section for presenting information for guiding the user to set the user in the frame of a fixed captured image captured by the fixed image capturing unit. The guiding information presentation section transmits information for guiding the user to a portable unit having the portable image capturing section to cause the portable unit to output the information.

6 Claims, 5 Drawing Sheets

USER GUIDING APPARATUS AND AN IMAGE CAPTURING SYSTEM, METHOD AND PROGRAM FOR USING SAME

CROSS REFERENCE TO RELATED APPLICATION

The present application claims priority from a Japanese Patent Application No. 2004-368366 filed on Dec. 20, 2004, the contents of which are incorporated herein by reference.

BACKGROUND OF THE INVENTION

1. Field of the Invention

The present invention relates to an image capturing system, an image capturing method and a program, particularly relates to an image capturing system for guiding users, an image capturing method and a program for the image capturing system.

2. Related Art

Generally, as a system for capturing images of users using the camera installed in such a theme park, a system in which images are captured by a camera according to an instruction from a shutter device held by the user is known as described in Japanese Patent Application Publication No. 2003-78804, for example. In the system, an alarm tone is generated from the shutter device held by the user when the user arrived at around the snapping spot of the camera installed in such as a flower garden. After perceiving the alarm tone, the user pushes the shutter button of the shutter device to capture an image using the camera. Thereby the user can capture the image using the camera at the desired shutter timing.

However, in such system, a user can not easily recognize the snapping spot until the user arrives at around the snapping spot. Additionally, when a user wants to take a picture against a background of the whole notable building in a theme park, the user can not correctly know whether the user is on the position allowing the user to capture an image with the best composition in the snapping point, for example. Therefore, the notable building to set the user in the frame of the background may be hidden by the user depending on the user's position. Then, the user can not easily capture the image with the desired composition.

SUMMARY OF THE INVENTION

Thus, the object of the present invention is to provide an image capturing system, an image capturing method and a program which can solve the above-described problems. This object is achieved by combining the features recited in independent claims. Then, dependent claims define further effective specific example of the present invention.

The image capturing system of a first embodiment of the present invention includes: a fixed image capturing unit for fixedly installed at a predetermined position; a three-dimensional image information storage section for storing three-dimensional image information regarding the region including the fixed image capturing unit; an image comparison section for comparing a portable captured image captured by a portable image capturing section held by a user with the three-dimensional image information stored in the three-dimensional image information storage section; a position determination section for determining the position and the orientation of the user holding the portable image capturing section based on the comparison result by the image comparison section; and a guiding information presentation section for presenting information for guiding the user to appear in a fixed captured image captured by the fixed image capturing unit.

The guiding information presentation section may transmit information for guiding the user to a portable unit having a portable image capturing section to cause to the portable unit to output the same. The portable unit may further include a display section for displaying a portable captured image captured by the portable image capturing section. The guiding information presentation section may superimpose information indicating at least one of the orientation or position of the fixed image capturing unit on the portable captured image displayed by the display section to cause the display section to display.

The image capturing system may further includes a GPS information acquiring section for acquiring GPS information indicating the position of the portable image capturing section. The image comparison section may compare three-dimensional image information stored in the three-dimensional image information storage section corresponding to the region which can be viewed from a predetermined range including the position of the portable image capturing section which is indicated by the GPS information acquired by the GPS information acquiring section with the portable captured image captured by the portable image capturing section.

The image capturing method according to a second embodiment of the present invention includes the steps of: comparing a portable captured image captured by a portable image capturing section held by a user with the three-dimensional image information regarding a region including a fixed image capturing section fixedly installed at a predetermined position, which is previously stored in a three-dimensional image information storing section; determining the position and the orientation of the user holding the portable image capturing section based on the comparison result in the image comparison step; presenting information for guiding the user to set the user in the frame of a fixed captured image captured by the fixed image capturing unit; and capturing an image of the user by the fixed image capturing section.

A program according to a third embodiment of the present invention is a program for an image capturing system for guiding users. The program causes the image capturing system to operate as a three-dimensional image information storing section for three-dimensional image information including a fixed image capturing unit fixedly installed at a predetermined position, an image comparison section for comparing a portable captured image captured by a portable image capturing section held by the user with the three-dimensional image information stored in a three-dimensional image information section, a position determination section for determining the position and the orientation of the user holding the portable image capturing section based on the comparison result by the image comparison section and a guiding information presentation section for presenting information for guiding the user to set the user in the frame of a fixed captured image captured by the fixed image capturing unit.

Here, all necessary features of the present invention are not listed in the summary of the invention. The sub-combinations of the features may become the invention.

DETAILED DESCRIPTION OF THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
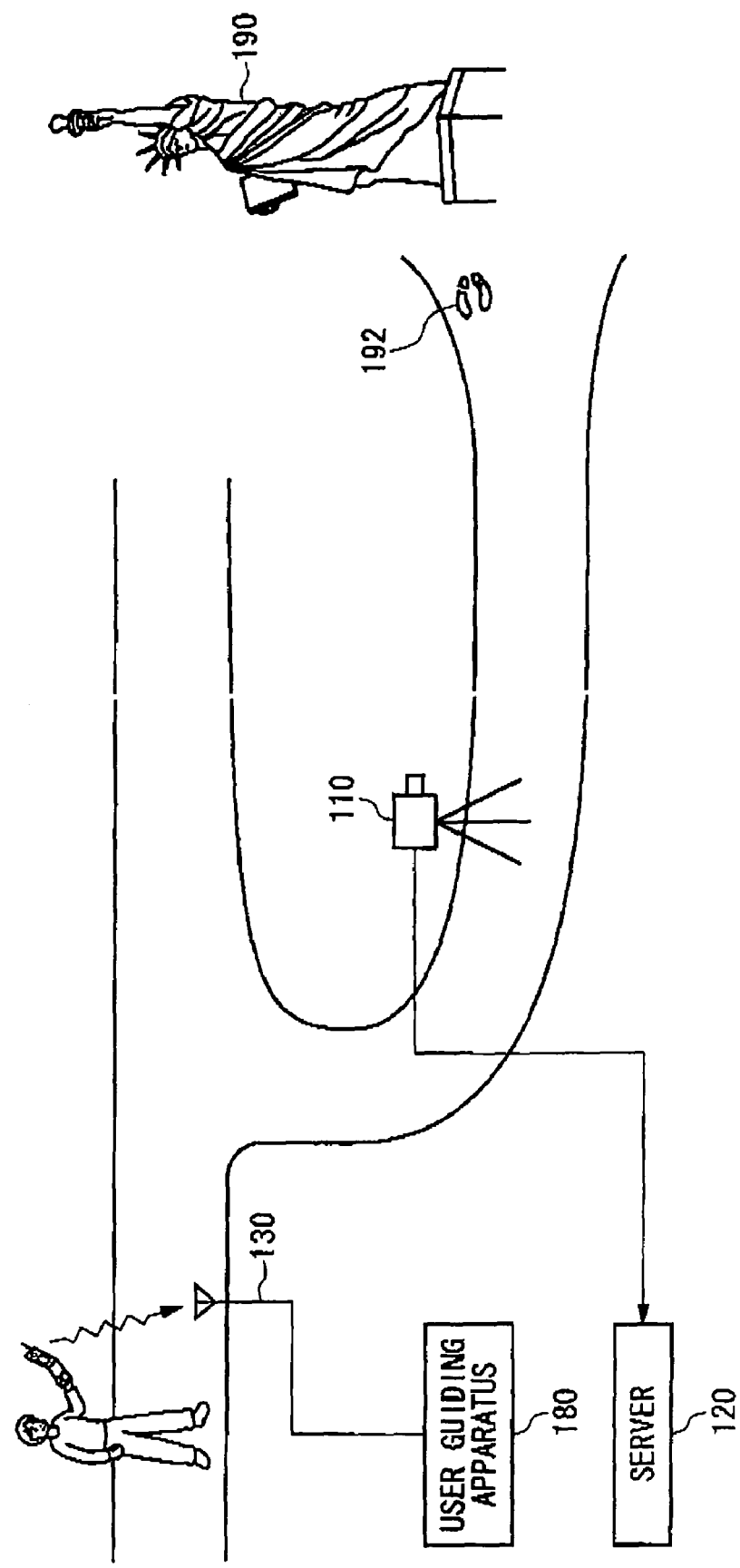
FIG. 1 shows an example of an environment for the usage of an image capturing system.

FIG. 1 shows an example of an environment for the usage of the image capturing system according to an embodiment of the present invention. The image capturing system captures pictures of users who play in a theme park and provides the pictures to the users. A fixed image capturing unit 110 is installed at the position at which the user image can be captured against a background of a notable bronze statue 190 of the theme park. The user captures the landscape image around the user using a portable unit 140 held by the user. The portable unit 140 transmits the landscape image to the user guiding apparatus 180. The user guiding apparatus 180 compares the landscape image received from the portable unit 140 with a three-dimensional map information including the amusement park, which is stored in the user guiding apparatus 180 to calculate the user position in the amusement park at which the landscape image has been captured.

The user guiding apparatus 180 transmits information for guiding the user from the calculated user position in the amusement park to a capturing position by the fixed image capturing unit 110 to the portable unit 140. The information is such as a position of the fixed image capturing unit 110 and a position at which the user should stand in order to capture the user image against background of the bronze statue. The portable unit 140 displays the guiding information received from the user guiding apparatus 180 to guide the user to the position captured by the fixed image capturing unit 110. The user moves as viewing the guiding information displayed on the portable unit 140. An image capturing position mark 192 is made on the user position close to the bronze statue 190 at which the user should stand to capture the user image against a background of the bronze statue 190. The user stands on the image capturing position mark 192 and captures the user image against a background of the bronze statue using the fixed image capturing unit 110.

A server 120 acquires the image captured by the fixed image captured unit 110 and stores the same in directories provided for each user, such as directories associated with each portable unit 140. Then, users receive the image stored in the saver 120 for each user when the users leave the amusement park. The server 120 may transmit the images stored in the server 120 to the portable unit 140 to provide the same to the users. Here, the portable terminal 140 may be an PDA (personal digital assistant) such as a camera cell-phone held by the user and may be a rental PDA provided by the amusement park.

The image capturing system according to the present embodiment is capable of guiding a user to the position captured by the fixed image capturing unit 110. Therefore, the user can capture an image with the appropriate composition using the fixed image capturing unit 110.

Figure 2:
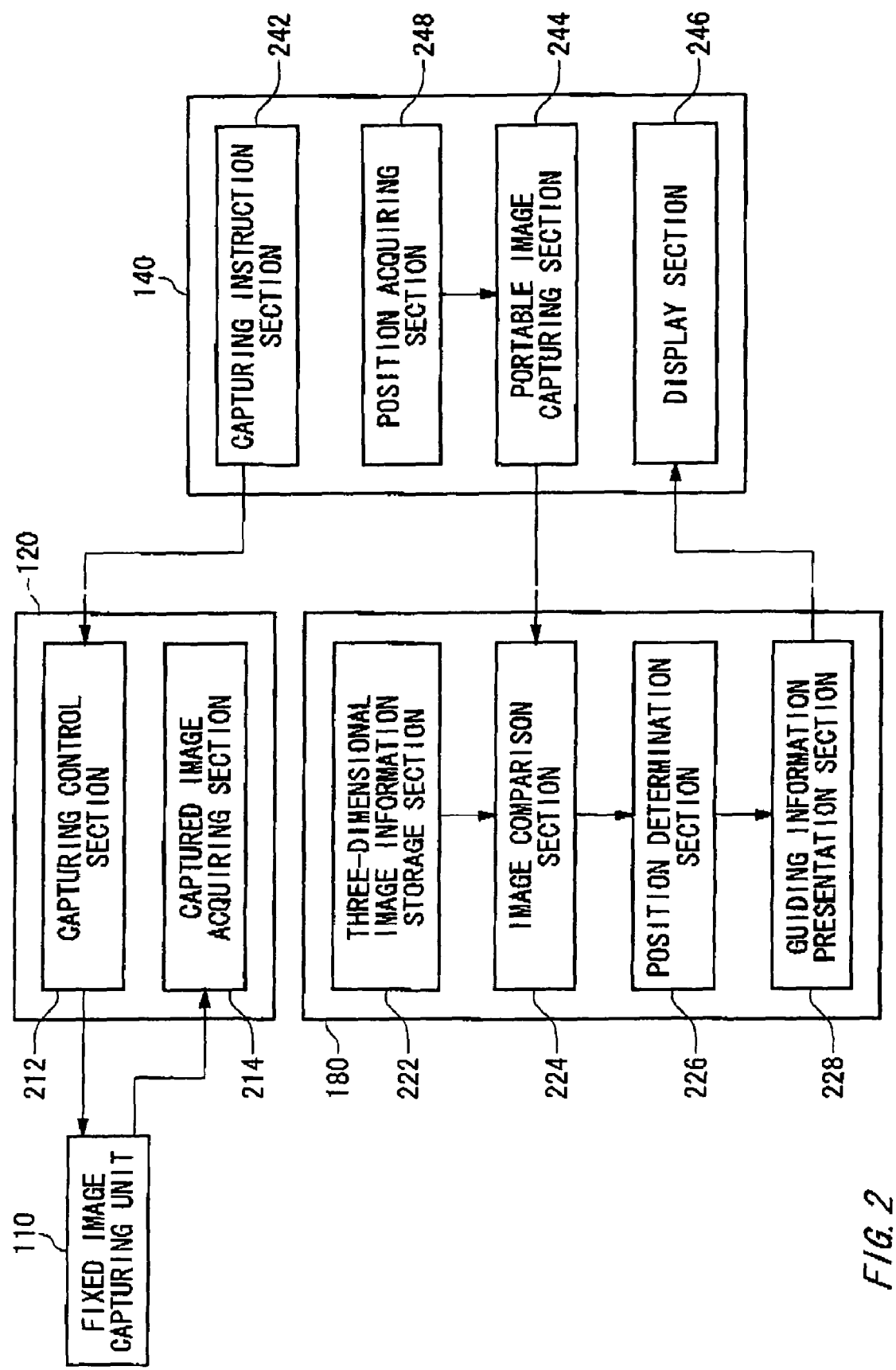
FIG. 2 shows an example of the block construct of the image capturing system.

FIG. 2 shows an example of the block construct of the image capturing system. The image capturing system includes the fixed image capturing unit 110, the server 120, the user guiding apparatus 180 and the portable unit 140. The server 120 has a capturing control section 212 and a captured image acquiring section 214. The user guiding apparatus 180 has a three-dimensional image information storage section 222, an image comparison section 224, a position determination section 226 and a guiding information presentation section 228. The portable unit 140 has a capturing instruction section 242, a portable image capturing section 244, a position acquiring section 248 and a display section 246.

The portable terminal 140 is held by a user. The capturing instruction section 242 instructs the fixed image capturing unit 110 on capturing images. On receiving a signal instructing the fixed image capturing unit 110 on capturing images, the capturing control section 212 captures an image using the fixed image capturing unit 110.

For example, the capturing control section 212 receives a capturing instruction from the capturing instruction section 242 by an antenna section 130 through radio communication. Additionally, the capturing control section 212 may receive a capturing instruction from the capturing instruction section 242 through infrared communication.

The fixed image capturing unit 110 is fixedly installed at a predetermined position. The fixed image capturing unit 110 receives light from a subject by an image capturing device such as a CCD to capture an image of the subject. Then, the captured image acquiring section 214 acquires the captured image captured by the fixed image capturing unit 110 and stores the same.

Additionally, the fixed image capturing unit 110 may continuously capture the subject at a predetermined time interval. Then, the fixed image capturing unit 110 may store a predetermined number of images which are continuously captured. The captured image acquiring section 214 may acquire the image captured at the timing proximate to the instructed time for capturing by the fixed image capturing unit 110 among the captured images stored in the fixed image capturing unit 110.

The server 120 may transmit the captured image acquired by the captured image acquiring section 214 to the portable unit 140. Then, the portable unit 140 may display the captured image received from the server 120 on the display section 246 to present to the user.

The portable image capturing section 244 captures images according to the user operation to generate the portable captured image. The portable image capturing section 244 may be such as a camera held by the user and a camera cell-phone, which capture portable captured images around the user according to the user operation.

The three-dimensional image information storage section 222 stores three-dimensional image information regarding the region including the fixed image capturing unit 110. The three-dimensional image information is, more specifically, three-dimensional map image information regarding a region equal to or more the region being able to be captured by the portable unit 140.

The image comparison section 224 compares a portable captured image captured by the portable image capturing section 244 with the three-dimensional image information previously stored in the three-dimensional image information storage section 222. The position determination section 226 determines the position and the orientation of the user holding the portable image capturing section 244 based on the comparison result by the image comparison section 224. The guiding information presentation section 228 presents information for guiding user to set the user in the frame of a fixed captured image captured by the fixed image capturing unit 110. Specifically, the guiding information presentation section 228 transmits information for guiding the user to the portable unit 140 to cause the portable unit 140 to output the information. Thereby the user can move toward the fixed image capturing unit 110 as viewing the position of the fixed image capturing unit 110 at any time.

the display section 246 displays the portable captured image captured by the portable image capturing section 244. Then, the guiding information presentation section 228 superimposes information indicative of at least one of the direction and the position of the fixed image capturing unit 110 on the portable captured image displayed on the display section 246 and causes the display section 246 to display the same. The guiding information presentation section 228 presents to a user the information for guiding the user on the portable captured image captured by the portable image capturing section 244. Therefore, the user can easily move toward the fixed image capturing unit 110 in comparison with moving to the fixed image capturing unit 110 as checking the current positional relationship between the user and the fixed image capturing unit 110 using a map.

The position acquiring section 248 acquires the position of the portable image capturing section 244. Specifically, the position acquiring section 248 is an example of a GPS acquiring section of the present invention, which receives GPS information from a Global Positioning System satellite and acquires the latitude and the longitude of the portable unit 140 based on the received GPS information. The image comparison section 224 compares the three-dimensional image information stored in the three-dimensional image information storage section 222 which corresponds to the region being able to be viewed from a predetermined range including the position of the portable image capturing section 244 obtained by the position acquiring section 248 with the portable captured image captured by the portable image capturing section 244. Thereby the position determination section 226 can limit the range of the three-dimensional image information for comparing to the range close to the portable unit 140 when the three-dimensional image information is compared with the portable captured image. Therefore, the position determination section 226 can more speedily determine the position of the portable image capturing section 244 than when the range is not limited.

Figure 3:
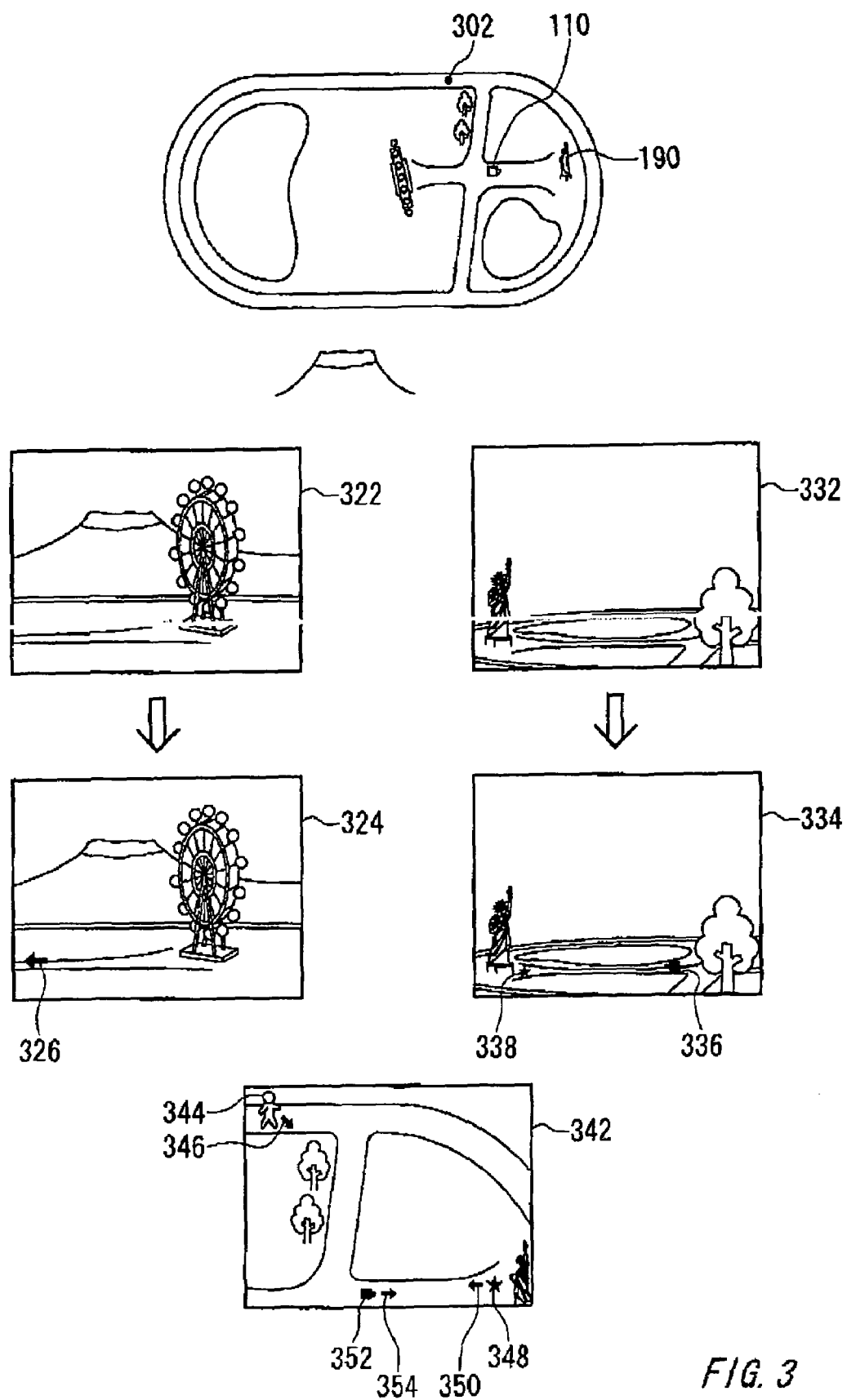
FIG. 3 shows an example of the procedure presenting information for guiding a user by a user guiding apparatus 180.

FIG. 3 shows an example of the procedure presenting information for guiding a user by a user guiding apparatus 180. The portable unit 140 captures the image around the user according to the user operation. For example, the portable unit 140 captures portable captured images (322 and 332) as images around the user at the user position 302 in the amusement park. Then, the portable unit 140 transmits the portable captured image to the image comparison section 224. At this time, the image comparison section 224 compares the portable captured image received from the portable image capturing section 244 with the three-dimensional image information stored in the three-dimensional image information storage section 222. Then the position determination section 226 determines the position and the orientation of the portable unit 140 which captured the portable captured image based on the comparison result by the image comparison section 224.

Specifically, the image comparison section 224 selects the position in the range included in the three-dimensional map image stored in the three-dimensional image information storage section 222 as an image capturing position. Then, the image comparison section 224 may select the capturing direction captured from the selected image capturing position per one degree. Further the image comparison section 224 may select the angle of view captured in the selected capturing direction per one degree. Then, the image comparison section 224 calculates the pixel value for each image acquired when images are captured under the condition of a plurality of capturing directions and a plurality of angles of view at a plurality of capturing positions by using the three-dimensional image information to generate a plurality of comparison images. Here, the image comparison section 224 may acquire the zooming value of the portable captured image from the portable image capturing section 244 and generate a comparison image to be acquired by capturing at the acquired zooming value. The image comparison section 224 may generate a comparison image with the resolution same as that of the acquired portable captured image. Then, the image comparison section 224 calculates the difference between the plurality of comparison images and the portable captured image received from the portable image capturing section 244. Then, the position determination section 226 determines, among the plurality of comparison images, the image capturing position and direction at which the comparison image having the smallest difference from the portable captured image is generated as a position and direction for each user holding the portable unit 140.

The information presentation section 228 previously stores the position of the fixed image capturing unit 110 in the three-dimensional image information stored in the three-dimensional image information storage section 222. Then, the guiding information presentation section 228 transmits the information for guiding the user holding the portable unit 140 based on the position and the orientation of the user determined by the position determination section 225 and the position of the fixed image capturing unit 110 previously stored. For example, the guiding information presentation section 228 transmits the position or the orientation of the image capturing unit 110 in the portable captured image to the portable unit 140.

Additionally, the guiding information presentation section 228 may previously store the captured region of the fixed image capturing unit 110 in the three-dimensional image information stored in the three-dimensional image information storage section 222. Then, the guiding information presentation section 228 determines the position or the orientation of the captured region of the fixed image capturing unit 110 in the portable captured image based on the position and the orientation of the user determined by the position determination section 226 and the previously stored captured region of the fixed image capturing unit 110 and transmits the same to the portable unit 140.

Further, the guiding information presentation section 228 may previously store the position at which the user should be positioned in order to capture the image with the best composition by the fixed image capturing unit 110, in the three-dimensional image information stored in the three-dimensional image information storage section 222. Then, the guiding information presentation section 228 determines the position at which the user should be of the orientation to which the user should face and transmits the same to the portable unit 140.

The display section 246 superimposes a direction mark 326 indicating the direction of the fixed image capturing unit 110, the direction of the captured region of the fixed image capturing unit 110 or the direction to which the user should be positioned on the portable captured image 322 which is received from the guiding information presentation section 228 and displays the same (guiding image 324). Then, the user moves toward the direction mark 326 in the guiding image 324, so that the user can capture an image using the fixed image capturing unit 110.

Here, the guiding information presentation section 228 may calculate the distance from the user position determined by the position determination section 226 to the position of the fixed image capturing unit 110, the captured region captured by the fixed image capturing unit 110 or the position at which the user should be positioned and transmit information indicative of the distance to the portable unit 140. Then the display section 246 may further superimpose the information indicative of the distance received from the guiding information presentation section 228 and display the same.

Additionally, the display section 246 superimpose an image capturing apparatus mark 336 indicative of the position of the fixed image capturing unit 110 received from the guiding information presentation section 228 on the portable captured image 332 and displays the same (guiding image 334). Further, the display section 246 superimposes a user position mark 338 indicative of the position at which the user should be positioned received from the guiding information presentation section 228 on the portable captured image and displays the same. Furthermore, the display section 246 may superimpose a mark indicative of the captured region by the fixed image capturing unit 110 in the portable captured image received from the guiding information presentation section 228 on the portable captured image and display the same.

The user guiding apparatus 180 may transmit a map image for guiding the user to the captured region by the fixed image capturing unit 110 to the portable unit 140 based on the position and the orientation of the user determined by the position determination section 226. For example, the position determination section 226 generates the map image including the user position determined by the position determination section 226. At this time, the position determination section 226 may generate the map image from the three-dimensional image stored in the three-dimensional image information storage section 222. Then, the guiding information presentation section 228 superimposes a user current position mark 344 on the user position determined by the position determination section 226 on the map image (guiding map image 342).

The guiding information presentation section 228 may generate a guiding map image 342 including a indication of the orientation of the user determined by the position determination section 226. For example, the guiding information presentation section 228 generates the guiding map image 342 including the user current position mark 344 in the shape of a person (user) faced to the direction determined by the position determination section 226. Thereby the user can easily identify the direction of the captured region by the fixed image capturing unit 110 and the current orientation of the user from the current position, so that the user can more speedily determine the direction to which the user should move.

Additionally, the guiding information presentation section 228 may generate the guiding map image 342 including a user position mark 348 on the map image, which indicates the position at which the user captured by the fixed image capturing unit 110 should be positioned. Additionally, the guiding information presentation section 228 may generate the guiding map image 342 further including an image capturing apparatus mark 352 indicative of the position of the fixed image capturing unit 110. Further, the guiding information presentation section 228 may generate the guiding map image 342 further including a user orientation mark 350 indicative of the direction of the fixed image capturing unit 110. Further, the guiding information presentation section 228 may previously store the capturing direction of the fixed image capturing unit 110 and generate the guiding map image 342 further including a capturing direction mark 354 indicative of the capturing direction. Furthermore, the guiding information presentation section 228 may generate the guiding map image further including a mark indicative of the captured region by the fixed image capturing unit 110.

The guiding image presentation section 228 may generate the guiding map image 342 further including a user moving direction mark 346 indicative of, from the user position, the position of the fixed image capturing unit 110, the captured region by the fixed image capturing unit 110 or the direction toward the position at which the user should be positioned. Additionally, the guiding information presentation section 228 may generate the guiding map image 342 including the user current position mark 344 indicative of the user current position and the direction toward the position at which the user should move. For example, the guiding image presentation section 228 generates the guiding map image 342 including the user current position mark 344 in the shape of the person faced to the direction toward the position at which the user should move.

Here, the guiding information presentation section 228 may generate the guiding map image of the region including a plurality of fixed image capturing units 110. Additionally, the guiding information presentation section 228 may generate the guiding map image of the region including the fixed image capturing unit 110 located proximate to the user current position. Further the guiding information presentation section 228 may associate the fixed image capturing unit 110 previously selected by the user with the portable unit 140 held by the user and store the same. Then, the guiding information presentation section 228 may generate the guiding map image of the region including the fixed image capturing unit 110 associated with the portable unit 140 and stored, and present the same to the portable unit 140.

The guiding information presentation section 228 may guide the user to set the user in the frame of the fixed captured image captured by a fixed image capturing unit 110 by voice. Specifically, the guiding information presentation section 228 generates a guiding voice for guiding the user and transmits the same to the portable unit 140 held by the user. Then the portable unit 140 held by the user reproduces the guiding voice transmitted from the guiding information presentation section 228 to guide the user. For example, the guiding information presentation section 228 generate a guiding voice indicative of at least one of the direction toward the position of the fixed image capturing unit 110 regarding the user position and orientation determined by the position determination section 226 or the distance from the determined user position to the fixed image capturing unit 110, and at least one of the direction toward the captured region by the fixed image capturing unit 110 regarding the determined user position and orientation or the distance from the determined user position to the position of the fixed image region. For example, the guiding information presentation section 228 generates a guiding voice, such as "Move toward ahead left by 400 m". Here, the portable unit 140 may receive the above-described direction or distance from the guiding information presentation section 228 and generate a guiding voice from the received direction or distance, of course.

Further, the guiding information presentation section 228 may determine, from the user position determined by the position determination section 226, the position of the fixed image capturing unit 110 or the user path of movement to the captured region by the fixed image capturing unit 110 based on the three-dimensional image information stored in the three-dimensional image information storage section 222, and generate a guiding voice indicative of the determined path of movement. For example, the guiding information presentation section 228 may generate a guiding voice, such as "Move forward left by 100, turn right and continue to move forward by 300 m". Here, the three-dimensional image information storage section 222 may store information indicative of an region into which the user can enter with the three-dimensional image information. The region into which the user can enter may be such as avenues and open spaces in the amusement park. Then, the guiding information presentation section 228 may determine the position of the fixed image capturing unit 110 or the path of movement to the captured region by the fixed image capturing unit 110 based on the information indicative of the region into which the user can enter stored in the three-dimensional image information section 222 and the user position determined by the position determination section 226.

Selecting the capturing position for generating a comparison image, the image comparison section 224 may select the position in the region into which the user can enter on the three-dimensional image information stored in the three-dimensional information storage section 222, such as avenues and open spaces. Thereby the position determination section 226 can more speedily determine the comparison image corresponding to the portable captured image in comparison with in the case of generating a comparison image captured at the capturing position in the wider region in the amusement park.

The server 120 may receive radio signals transmitted from the portable unit 140 using a plurality of antenna units 130. Then the image comparison section 224 may further determine the region in which the portable terminal 140 exist in the three-dimensional image information based on the intensity of the radio signal received from the portable unit 140.

For example, the image comparison section 224 selects the position in a predetermined region including the antenna section 130 which receives the radio signals from the portable unit 140 with the highest intensity when the image comparison section 224 selects the capturing position for generating a comparison image. Additionally the image comparison section 224 may determine the region in which the portable unit 140 exists based on the intensity of the radio signal from the portable unit 140 received by three or more antenna units 130 which are not in alignment and the position of the antenna section 130. Then, the image comparison section 224 selects the position of the predetermined region including the determined region as a capturing position at which a comparison image is generated.

The portable unit 140 may associate GPS information received from the Global Positioning System satellite within the predetermined period including the time at which a portable captured image is captured with the portable captured image and store the same. Then the portable unit 140 transmits the portable captured image with the GPS information associated with the portable captured image and stored to the image comparison section 224. Specifically, the portable image capturing section 244 transmits the portable captured image with the GPS information acquired by the position acquiring section 248 to the image comparison section 224. Then, the image comparison section 224 determines the region in which the portable unit 140 exists based on the GPS information received from the portable unit 140 and selects the position in the predetermined region including the determined region when the image comparison section 224 selects a capturing position for generating a comparison image. Thereby the position determination section 226 may compare the range of the three-dimensional image information which can be viewed by the user at the position indicated by the GPS information with the portable captured image, so that the orientation of the user can be more speedily determined. Here, even if the position indicated by the GPS information includes any error, the error of the user position determined by the position determination section 226 can be reduced by comparing the range of the three-dimensional image information which can be viewed by the user from nearby the position with the portable captured image.

The image comparison section 224 may determine the image region having the frequency component less than a predetermined frequency with the intensity more than a predetermined intensity in the portable captured image received from the portable image capturing section 244 as an image region on which sky is shown up, so that the image comparison section 224 may compare the portable captured image with the comparison image except for the region on which sky is shown up. Thereby the image comparison section 224 can appropriately compare the portable captured image with the comparison image even if sky is shown up on the portable captured image. Additionally, the image comparison section 224 may extract the subject shown up on the portable captured image using such as an edge extraction to compare the subject with the comparison image obtained by the three-dimensional map information by such as a pattern matching.

Figure 4:
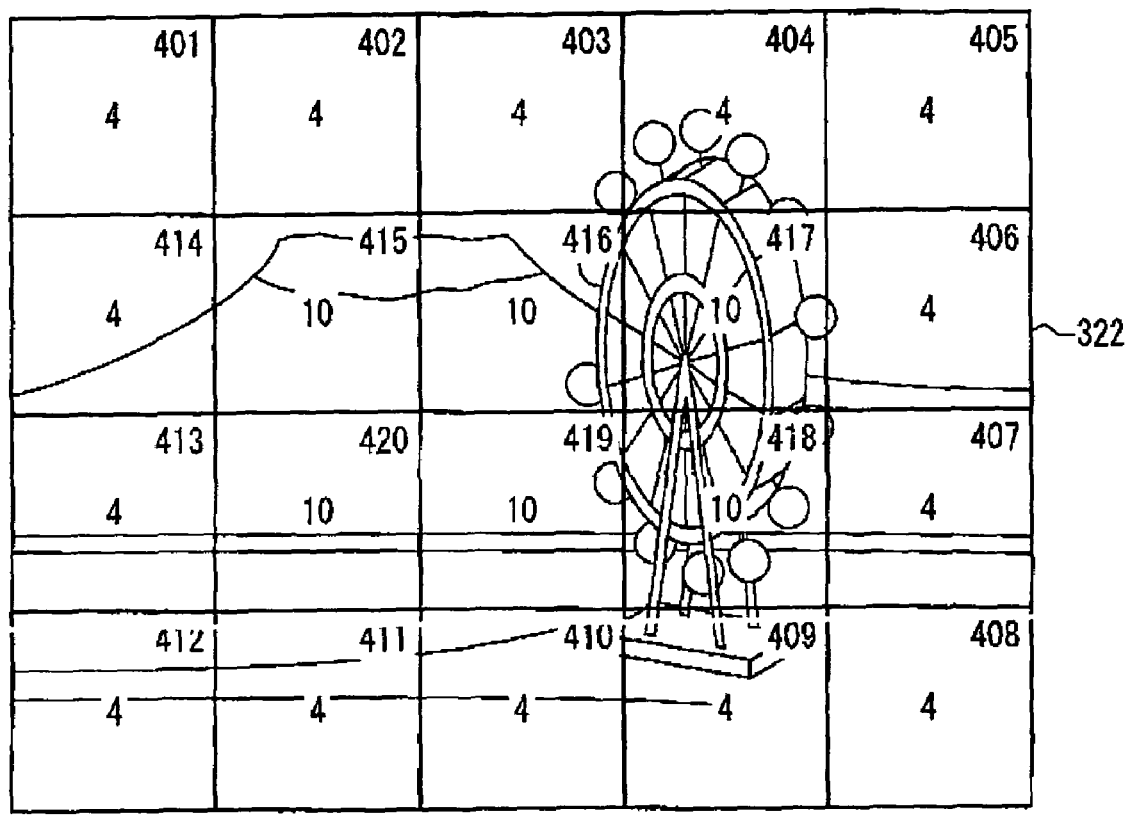
FIG. 4 shows an example of dividing the portable captured image when the portable captured image weighted for each divided section is compared with a comparison image.

FIG. 4 shows an example of dividing the portable captured image when the portable captured image weighted for each divided section is compared with a comparison image. Comparing the portable captured image 322 with the three-dimensional image information, the comparison section 224 generates a comparison result by weighting the comparison result obtained by comparing a partial region of the portable captured image 322 with the three-dimensional image information rather than the comparison result obtained by comparing the other region of the portable captured image 322 with the three-dimensional image information. Specifically, the image comparison section 224 generates a comparison result by weighting the comparison result obtained by comparing the center of the portable captured image 322 with the three-dimensional image information.

More specifically, the image comparison section 224 compares a portable captured image 400 with the comparison image such that each image content for a predetermined number of partial regions of the portable captured image 400 is compared with the comparison image to calculate the coincidence for each partial region. The image comparison section 224 previously determines a weighting factor for the coincidence for each partial region. Specifically, the image comparison section 224 determines that the weighting factor of the center region is larger than that of the peripheral region. As shown in FIG. 4, the weighting factor for partial regions 401-414 located on the outside of the image is determined as 4 and the weighting factor for partial regions 415-420 located on the inside of the image is determined as 10. The image comparison section 224 determines the coincidence obtained by summing the value for each partial region by which the calculated coincidence is multiplied by the weighting factor as the comparison result by comparing the portable captured image with the comparison image. Thus, the image comparison section 224 evaluates that the coincidence of the center of the portable captured image is higher than that of the partial regions of the image, so that an aberration effect in the partial regions of the portable captured image on the comparison result by comparing the portable captured image with the comparison image can be reduced.

Here, the image comparison section 224 may determine larger the weighting factor of the partial region with a higher spatial frequency of the image. Additionally, an example of the operation that the image comparison section 224 compares each predetermined partial region of the portable captured image with the three-dimensional image information is described above. However, the image comparison section 224 may compare each partial region set by the portable image capturing section 244 with the three-dimensional image information. For example, the portable image captured section 244 calculates the importance of the image for each partial region and records importance information in which the calculated importance information is associated for each partial region along with the portable captured image. For example, the portable image capturing section 244 records importance information indicative of the weighting factor according to the aberration effect along with the portable captured image. Specifically, the portable image capturing section 244 sets larger the weighting factor for the center of the partial region in the portable captured image. Then the image comparison section 224 calculates the coincidence between the comparison image and each partial region indicated by the importance information included in the portable captured image. Additionally, the image comparison section 224 may calculate the coincidence obtained by summing the value for each partial region by which the calculated coincidence is multiplied by the weighting factor as the comparison result by comparing the portable captured image with the comparison image.

According to the above-described image capturing system, a user can be easily guided from the current position to the position at which the user should be positioned in order to capture an image with the appropriate composition using the fixed image capturing unit 110. Therefore, the user can easily capture the image with the desired composition.

Figure 5:
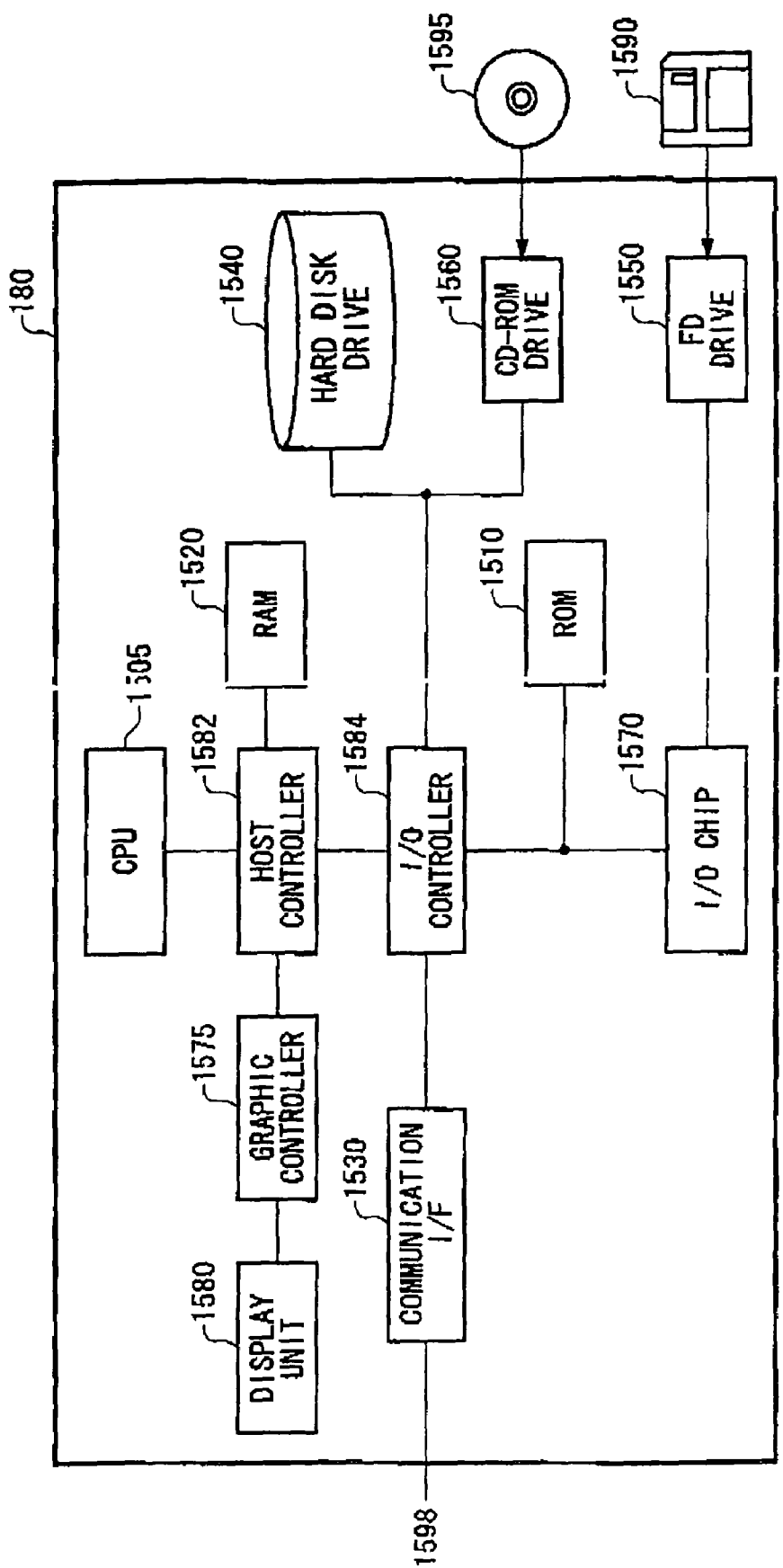
FIG. 5 shows an example of the hardware configuration of the user guiding apparatus 180.

FIG. 5 shows an example of the hardware configuration of the user guiding apparatus 180. The user guiding apparatus 180 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, a communication interface 1530 and a CD-ROM drive 1560 which are relatively high-speed input/output units. The hard disk drive 1540 stores the program and data used by the CPU 1505. The communication interface 1530 is connected to a network communication device 1598 to transmit/receive the program or data. The CD-ROM drive 1560 reads the program or data from the CD-ROM 1595 and provides the same to the hard disk drive 1540 and the communication interface 1530 through the RAM 1520.

The ROM 1510, and the flexible disk drive 1550 and input/output chip 1570 which are relatively low-speed input/output units are connected to the input/output controller 1584. The ROM 1510 stores a boot program executed by the user guiding apparatus 180 at activating and a program depending on the hardware of the user guiding apparatus 180. The flexible disk drive 1550 reads the program or data from a flexible disk 1590 and provides the same to the hard disk drive 1540 and the communication interface 1530 through the RAM 1520. The input/output chip 1570 connects various input/output units through the flexible disk drive 1550 and such as a parallel port, a serial port, a keyboard port and a mouse port.

The program executed by the CPU 1505 is stored in a recording medium, such as the flexible disk 1590, the CD-ROM 1595, or an IC card and provided by the user. The program stored in the recording medium may be compressed or not be compressed. The program is installed in the hard disk drive 1540 from the recording medium, read by the RAM 1520 and executed by the CPU 1505.

The program executed by the CPU 1505 operates the user guiding apparatus 180 as the three-dimensional image information storage section 222, the image comparison section 224, a position determination section 226 and the guiding information presentation section 228.

The above-described program may be stored in an external storage medium. The external recording medium may be an optical storage medium such as a DVD and a PD, a magnetooptical recording medium such as a MD, a tape medium and a semiconductor memory such as an IC card. A storage medium such as a hard disk or a RAM which is provided in the server system connected to a private communication network or Internet is used as the recording medium to provide the program to the user guiding apparatus 180 through the network.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An image capturing system comprising:
    a fixed image capturing unit fixedly installed at a predetermined position; and
    a user guiding unit including
    a three-dimensional image information storage section for storing three-dimensional image information associated with a geographical region including the fixed image capturing unit;
    an image comparison section for comparing an image captured by a portable image capturing device held by a user with the three-dimensional image information stored in the three-dimensional image information storage section;
    a position determination section for determining the position and orientation of the portable image capturing device when the image was captured based on the comparison result by the image comparison unit; and
    a guiding information presentation section for presenting information for guiding the user to set the user in the frame of an image captured by the fixed image capturing unit.

2. The image capturing system according to claim 1, wherein the guiding information presentation section transmits the information for guiding the user to the portable image capturing device having the portable image capturing section to output the information.

3. The image capturing system according to claim 2, wherein
the portable image capturing device includes a display section for displaying the image captured by the portable image capturing device, and
the guiding information presentation section superimposes information indicative of at least one of the direction and the position of the fixed image capturing unit on the portable captured image displayed by the display section and causes the display section to display the same.

4. The image capturing system according to claim 1, wherein the image capturing system further comprises a GPS image acquiring section for acquiring GPS information indicative of the position of the portable image capturing device, and wherein the image comparison section compares the three-dimensional image information stored in the three-dimensional image information storage section corresponding to a region which can be viewed from a predetermined range including the position of the portable image capturing device indicated by GPS information acquired by a GPS image acquiring unit with the image captured by the portable image capturing device.

5. An image capturing method comprising:
comparing an image captured by a portable image capturing device held by a user with the three-dimensional image information regarding a region including a fixed image capturing unit fixedly installed at a predetermined position, which is previously stored in a three-dimensional image information storage section;
determining the position and orientation of the portable image capturing device based on the comparison result in the comparison of the images;
presenting information for guiding the user to set the user in the frame of an image captured by the fixed image capturing unit; and
capturing an image of the user by the fixed image capturing section.

6. A computer readable medium having stored thereon a computer executable program for causing a processor to execute the steps of:
storing three-dimensional image information regarding a region including a fixed image capturing unit fixedly installed at a predetermined position;
comparing an image captured by a portable image capturing device held by a user with the stored three-dimensional image information;
determining the position and orientation of the portable image capturing device based on the comparison result; and
presenting information for guiding the user to set the user in the frame of an image captured by the fixed image capturing unit.

* * * * *